United States Patent

[11] 3,611,303

[72] Inventors Francesco Serracchioli Banchette; Antonio Bartocci, Ivrea, both of Italy

[21] Appl. No. 764,709
[22] Filed Oct. 3, 1968
[45] Patented Oct. 5, 1971
[73] Assignee Ing. C. Olivetti & C.S.p.A. Ivrea, Italy
[32] Priority Oct. 3, 1967
[33] Italy
[31] 53222-A/67

[54] APPARATUS FOR WRITING DATA IN A RECIRCULATING STORE
10 Claims, 4 Drawing Figs.

[52] U.S. Cl. ........ 340/172.5
[51] Int. Cl. ........ G06f 13/02
[50] Field of Search ........ 340/172.5; 235/157

[56] References Cited

UNITED STATES PATENTS

| | | | |
|---|---|---|---|
| 3,289,171 | 11/1966 | Scherr et al. | 340/172.5 |
| 3,323,119 | 5/1967 | Barcomb et al. | 340/324.1 |
| 3,328,772 | 6/1967 | Oeters | 340/172.5 |
| 3,340,514 | 9/1967 | Swift | 340/172.5 |
| 3,351,917 | 11/1967 | Shimabukuro | 340/172.5 |
| 3,407,387 | 10/1968 | Looschen et al. | 340/152 |
| 3,413,610 | 11/1968 | Botjer et al. | 340/172.5 |
| 3,396,377 | 8/1968 | Strout | 340/172.5 |
| 3,428,950 | 2/1969 | Ned Chang et al. | 340/172.5 |
| 3,435,421 | 3/1969 | Sharples | 340/172.5 |
| 3,440,613 | 4/1969 | Vercellotti et al. | 340/172.5 |

OTHER REFERENCES

IBM 7080 Data Processing System Reference Manuel–Form A22–6560–1, Dec. 1961

*Primary Examiner*—Paul J. Henon
*Assistant Examiner*—Mark Edward Nusbaum
*Attorney*—Birch, Swindler, McKie & Beckett

ABSTRACT: Apparatus for writing data in a recirculating store having a plurality of cells for storing characters. A keyboard posts characters to be written in the store which are entered in the cell currently marked by an identification sign. The identification sign may be automatically shifted to the next successive cell, or by one or more cells in response to operation of a key shift that functions independently of the automatic shifting means.

INVENTOR.
FRANCESCO SERRACCHIOLI
ANTONIO BARTOCCI

INVENTOR.
FRANCESCO SERRACCHIOLI
ANTONIO BARTOCCI

INVENTOR.
FRANCESCO SERRACCHIOLI
ANTONIO BARTOCCI

APPARATUS FOR WRITING DATA IN A RECIRCULATING STORE

CROSS-REFERENCE TO RELATED APPLICATIONS

Applicants claim priority from corresponding Italian Pat. application Ser. No. 53222–AA/67, filed on Oct. 3, 1967.

BACKGROUND OF THE INVENTION

1. Field of the Invention

The invention relates to an apparatus for writing data in a delay line store or other recirculating storage device. The apparatus can be used as a terminal interrogation and response apparatus connectable to a central electronic data processor and may have a cathode ray tube for visual display of information. Such terminal apparatus comprises a keyboard for composing messages to be stored.

2. Description of the Prior Art

In apparatus of this type known in the art, the input of data to storage is not effected in accord with adequate means for controlling the format of messages composed on the input keyboard. In general, the facility for writing data in the store in the most flexible manner is secured at the expense of an excess of service signals present in the store, with a consequent wasteful excess of components and control devices.

SUMMARY OF THE INVENTION

These and other disadvantages are obviated by the apparatus according to the invention which provides apparatus for writing data in a recirculating store. The apparatus comprises a recirculating store having a plurality of cells for storing characters, a keyboard for posting characters to be written in the store, means for entering each posted character in the cell currently marked by an identification sign, means for automatically shifting the identification sign to the next successive cell and an arrangement responsive to a key to shift the identification sign by one or more cells independently of the automatic shifting means.

DETAILED DESCRIPTION OF THE INVENTION

Figure 1:
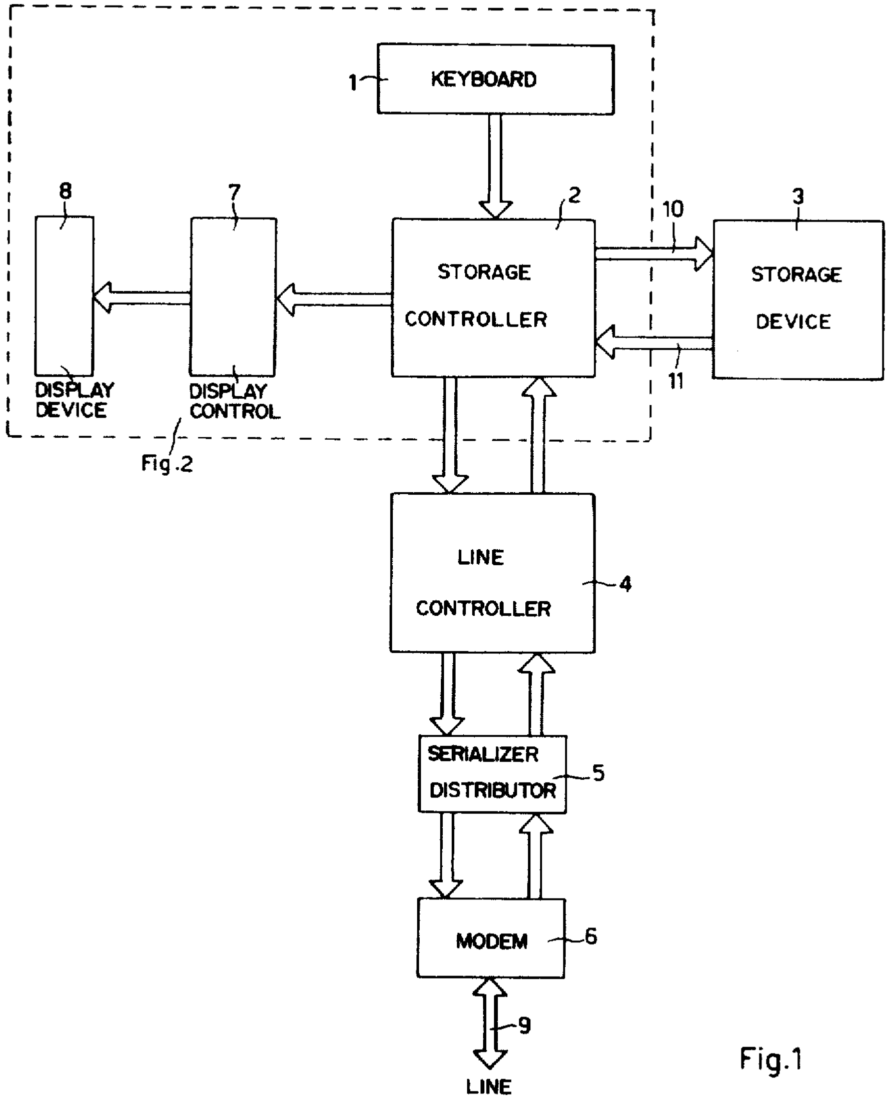
FIG. 1 is a block diagram of a complete terminal apparatus embodying the invention.

With reference to FIG. 1, keyboard 1 comprises alphabetical and numerical keys as well as operating keys for message control. Signals corresponding to the character represented by each actuated alphabetical or numerical key are fed, under supervision of storage controller 2, to storage device 3 and concurrently to controller 7 of visual display unit 8 to actuate the display. This causes visual reproduction of the characters by a cathode-ray tube. Successive characters of the message are in like manner typed on the keyboard and visually displayed.

The message thus read into storage device 3 is at the disposal of the central data processor. Moreover, by virtue of the screen persistence, it also remains fully displayed. At the request of the central data processor, line controller 4 instructs storage controller 2 to order retrieval of the message from storage device 3. The message is thereupon extracted character by character. Each character thus extracted is serialized by unit 5 and is applied by the modulator of modem 6 over transmission line 9 to the central computer substantially in the manner described in U.S. Pat. No. 3,381,272.

When, on the other hand, it is desired that the computer send a message to the terminal, line controller 4, having received such a request, establishes the reception modes. When the terminal is ready to receive, the information bits received on line 9 and demodulated by modem 6 are parallelized by unit 5 acting as a distributor in such manner as to recompose the single characters, which enter through line controller 4 and storage controller 2 into storage device 3 for reproduction on the screen of visual display unit 8. The structure of the message exchanged between terminal and central electrodata processing machine (EDPM) can be generally as described in our British Pat. application No. 43987/68 filed on Sept. 16, 1968, and the corresponding U.S. Pat. application Ser. No. 764,708, filed Oct. 3, 1968, now U.S. Pat. No. 3,564,511.

More specifically, the message is constituted by one or more blocks, the component blocks being transmitted one at a time because the capacity of storage device 3 is confined to one block. Each block is prefixed by character STX indicating the start of a block and suffixed with character ETB indicating the end of a block. If however the block comprises the last one of the message, then character ETX is substituted for character ETB indicating the end of the complete message.

The function of line controller 4 is to superintend the preliminary dialog between terminal and computer for the purpose of establishing a channel of communication for the transmission of data; and the actual exchange of messages of interrogation and reply; and to check the correctness of the data transmitted.

The dialog procedures may be reduced essentially to two variants:

1. A "sounding or polling" procedure for dispatch of interrogative messages from the terminal to the computer; and 2. A "selection" procedure for the transmission of answering messages from the computer to the terminal.

These two procedures have already been described in the aforementioned application which also contains the description of a transmission controller in all respects similar to the present transmission or line controller 4.

Figure 4:
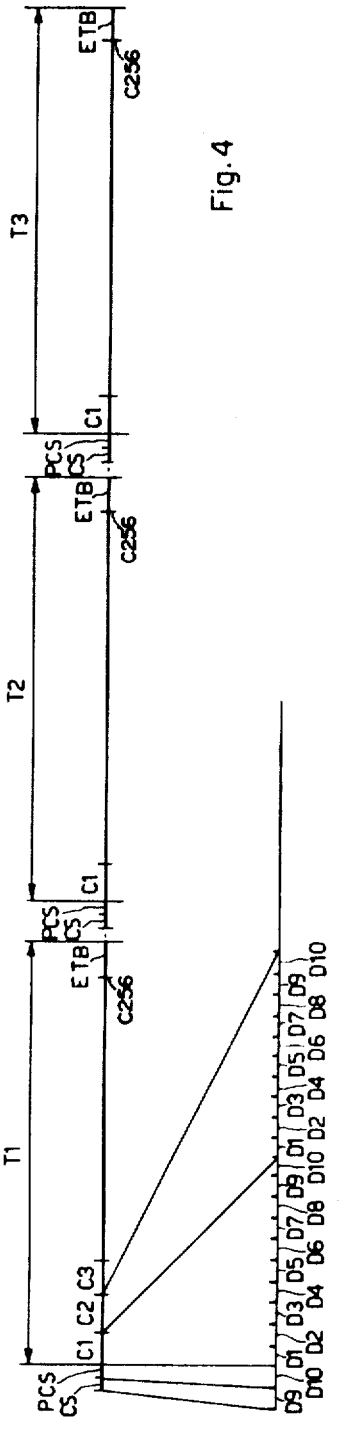
FIG. 4 shows a time diagram of the operation of the store.

Storage device 3 comprises a magnetostrictive delay line provided with output 11 and input 10 (FIGS. 1 and 2) respectively connected to amplifiers 13 and 14. The magnetostrictive delay line has a capacity of one block of characters. More specifically (FIG. 4), each storage cycle T1, T2, T3, etc., comprises 256 digit (i.e., character) periods or storage cells C1 to C256, each containing 10 bit periods from D1 to D10.

Each character read into storage device 3 is represented by seven bits stored respectively in the seven binary positions corresponding to the bit periods D3–D9. The binary position corresponding to bit period D10 is intended to contain a parity bit for the character in question. The binary position corresponding to bit period D1 is intended to contain a service bit "*bs*"=1 which, during the operation of writing in storage device 3, is gradually displaced by one digit period (storage cell) at a time to the next one in succession for the purpose of progressively indicating the storage cells or digit periods into which successive characters are to be entered.

Similarly, the binary position corresponding to the second bit period D2 is intended to contain a service bit "*bl*"=1 which, during the operation of reading from storage device 3, is gradually displaced from one digit period to the next in order to indicate the digit periods (storage cells) in which successive characters to be extracted from storage device 3 are to be read.

There are binary positions for containing start timing bit CS and relevant parity bit PCS before the 2560(256 ×10) binary positions of storage device 3. When bit CS is read from storage device 3, which is at each cycle, it triggers timer 23 which functions to apply a signal MS at each bit period (FIG. 2) and supply 256 (FIG. 4) trains of 10 signals D1 to D10 on separate lines. This serves to identify the corresponding bit periods of each digit period. When signal CS actuates timer 23, the latter starts to operate, transmitting signal D9 and then, cyclically, all the remainder.

Keyboard 1 (FIG. 2) comprises a storage reservation key by means of which the operator can reserve storage device 3 for the purpose of entering successive characters of a message into it by means of the numerical and alphabetical keys of the keyboard. Operation of the storage reservation key generates signal PRET which, if signal ASTAL produced by line controller 4 is present indicating that, under control of the computer, storage device 3 is assigned to the keyboard as opposed to being occupied for transmission from the computer, will trigger timer 23 and at the same time cause start timing bit CS to be fed into stage R1 of shift register 22 composed of 10 stages R1–R10. The shifting of bits in shift register 22 is commanded by signals MS generated one to each bit period. Under normal operating conditions, shift register 22 connects output 11 of storage device 3 to its input 10. It is thus evident that under normal operating conditions, the contents of storage device 3 are regenerated through shift register R1–R10, being however phase-shifted by one digit period at each storage cycle.

It is equally clear that after this operation of storage reservation, bit CS so introduced thereinto will continue to circulate therein for the purpose of ordering at each cycle, through line 95, the timing start previously recognized by the service bits monitoring service control circuit 27.

When the aforesaid reservation operation takes place, there is also effected in the first binary position D1 of the first stage storage cell C1 (i.e., in the binary position immediately following the parity bit of the timing bit CS), registration of service bit "*bs*." This is actually brought about by the fact that signal PRET then produced by the keyboard acts through the intermediary of the service bits monitoring service control circuit 27 to cause, by line 21, a bit equal to 1 to be written in the first stage R1 of shift register 22 during the bit period D1 that first arrives.

Counter 26 connected to the output of shift register 22 is able to count modulo 2 all bits equal to binary 1 which are applied to its input during bit periods D3–D9. At each bit period D10, the contents of circuit 26 are fed to the last stage of the shift register 22. It follows therefore that the bit thus fed represents the parity bit corresponding to the seven character bits just written into storage device 3 from the output of shift register 22.

Synchronizing bit CS, the relevant parity bit and service bit "*bs*,"a introduced during the storage reservation phase, continue to circulate in the storage device until such time as a character is posted on the keyboard. The characters thus posted are sent in parallel over line 71. When a character is actuated on the keyboard, the latter generates signal ICTA which acts through a circuit element in the service control circuit 27 to cause regeneration of service bit "*bs*" read on line 72 through line 21, not at the first digit period D1 encountered but at the next digit period D1, whereby the said bit will be shifted in the storage device by one digit period. Furthermore, under such conditions, reading of the said signal "*bs*" produces, by a circuit arrangement in the service control circuit 27, signal CAR which at the next digit period D1 causes transfer of the character from output 71 of the keyboard to input 74 of shift register 22. In effect, the seven bits of the character are fed into the stages R3–R9 of shift register 22. By virtue of shift signals MS, which are continuously produced, the character is therefore shifted in shift register 22 and entered into storage device 3.

The remaining characters are actuated or posted by the keyboard into storage device 3 (store) in similar fashion into each successive cell indicated by the bit "*bs*." It is clear therefore that by this means the characters successively actuated on the keyboard are methodically entered into the consecutive storage cells, C1, C2, C3 and so on, starting with the first cell C1 which follows the start of start timing bit CS. In the case therefore of a number, which is naturally actuated on the keyboard starting with its most significant digit, the latter will be contained in cell C1.

When, on the other hand, it is required to enter by line controller 4 a character originating from the transmission line into the storage device, the presence of the character in the character storage within line controller 4 is reported to storage controller 2 by signal ICCA produced by line controller 4. Signal ICCA authorizes transfer of the said character from output 75 of line controller 4 to register 51.

Acting through service control circuit 27, the same signal ICCA causes regeneration of the service bit "*bs*" read on line 72 to be effected through line 21, not at the first digit period D1 encountered but at the next one, whereby the said bit will be shifted in the storage device by one digit period. Under such conditions, reading of the said bit "*bs*" also produces, through service control circuit 27, signal CAL which in turn causes transfer of the character from register 51, through the input 74, to shift register 22. In effect, the seven bits of the character and the parity bit of the character are fed into stages R2–R9 of shift register 22. Under the action of shift signals MS which are continuously produced, the said character will therefore be shifted in shift register 22 and entered into the storage device.

When a message stored in the delay line is required to be sent to the central data processor, the terminal must be in the transmission state, which condition is reported by line controller 4 by means of signal LG. Like any other state of line controller 4, the transmission state is determined by the general conversational procedure between terminal and computer as described in the patent application hereinbefore referred to. If in this state, storage device 3 is assigned to the computer or is free, both of which conditions are reported by storage controller 2, then line controller 4 will generate signal LG ordering reading from storage device 3.

Acting through service control circuit 27, signal LG causes the service bit "*b1*" to be fed by line 21 to the bit period D2 immediately after having recognized, through line 72, start timing bit CS. At the next storage cycle, the reading command LG, acting through service control circuit 27, causes regeneration of service bit "*b1*" read on line 72 to be effected through line 21, not at the first digit period D2 encountered but at the next one, wherefore the said bit will be shifted in the storage device by one digit period. Under such conditions, reading of this bit also produces, through service control circuit 27, signal CAG which in turn causes transfer of the parallel bits of the character from output 91 of shift register 22 to input 92 of the character storage within the line controller 4.

In all the phases wherein the storage device is free (signal L) or assigned to the keyboard (AST), and provided the storage reading command LG be not present, the characters circulating in the delay line storage are visually displayed on the screen of the cathode-ray tube of visual display unit 8. In other words, the screen displays either the characters introduced from the keyboard, (because the "assigned to keyboard" state of the terminal is obtained on the occasion of reservation prior to digitizing the message), or the characters received from the computer after these have been checked and entered into the storage device, (because at the end of reception, transmission controller 4, following the aforesaid conversation procedure, brings the terminal into the "free" state). The logical sum of signals L and AST, respectively representing the "free" and "assigned to keyboard" states, is applied to coincidence circuit 76. Should the signal LG, which, as previously explained, gives the order for reading, be false, i.e., should the terminal not be in the transmission state, then, since $\overline{LG}$ is true, coincidence circuit 76 will furnish signal ASTAL which at each bit period D1 authorizes the character which in that period is contained in shift register 22, i.e., in the stages R1–R9 of the said register, to be transferred to register 51 composed of nine stages RU1–RU9, of which the first eight are intended for containing the character and the ninth for memorizing the service bits "*bs*"=1 that may be associated therewith.

During visual reproduction, register 51 acts as an input register for visual display unit 8. The character present in register 51 is decoded by decoder 54 which is provided with the same number of output wires (character wires) as there are alphabetical characters, decimal digits (10 in number) and associated signs such as +, −, point, etc. Decoder 54 feeds matrix 55 constituted by 7 rows and 5 columns of magnetic cores. The aforesaid character wires are linked with the cores of the matrix in such a manner that when decoder 54 activates a given character wire all and only those cores which give spatially the form of the character in question are put into binary state 1. Thus, in matrix 55, each character is represented by a spatial distribution of (7×5) or 35 bits.

Each start timing signal CS read from the storage device causes row counter 56 to advance by one step. Counter 56 counts the seven rows of the matrix cyclically and repetitively. It is evident therefore that counter 56 advances by one step at each storage cycle.

Row counter 56 is decoded by decoder 57 which activates the rows of the core matrix one after the other, whereby each row remains energized for a complete cycle of the delay line storage, i.e., until the next application of start timing signal CS, whereat the next row starts to be activated. More specifically, each output of decoder 57 is connected to a separate interrogation wire linked with all the cores of the relevant row.

Figure 2:
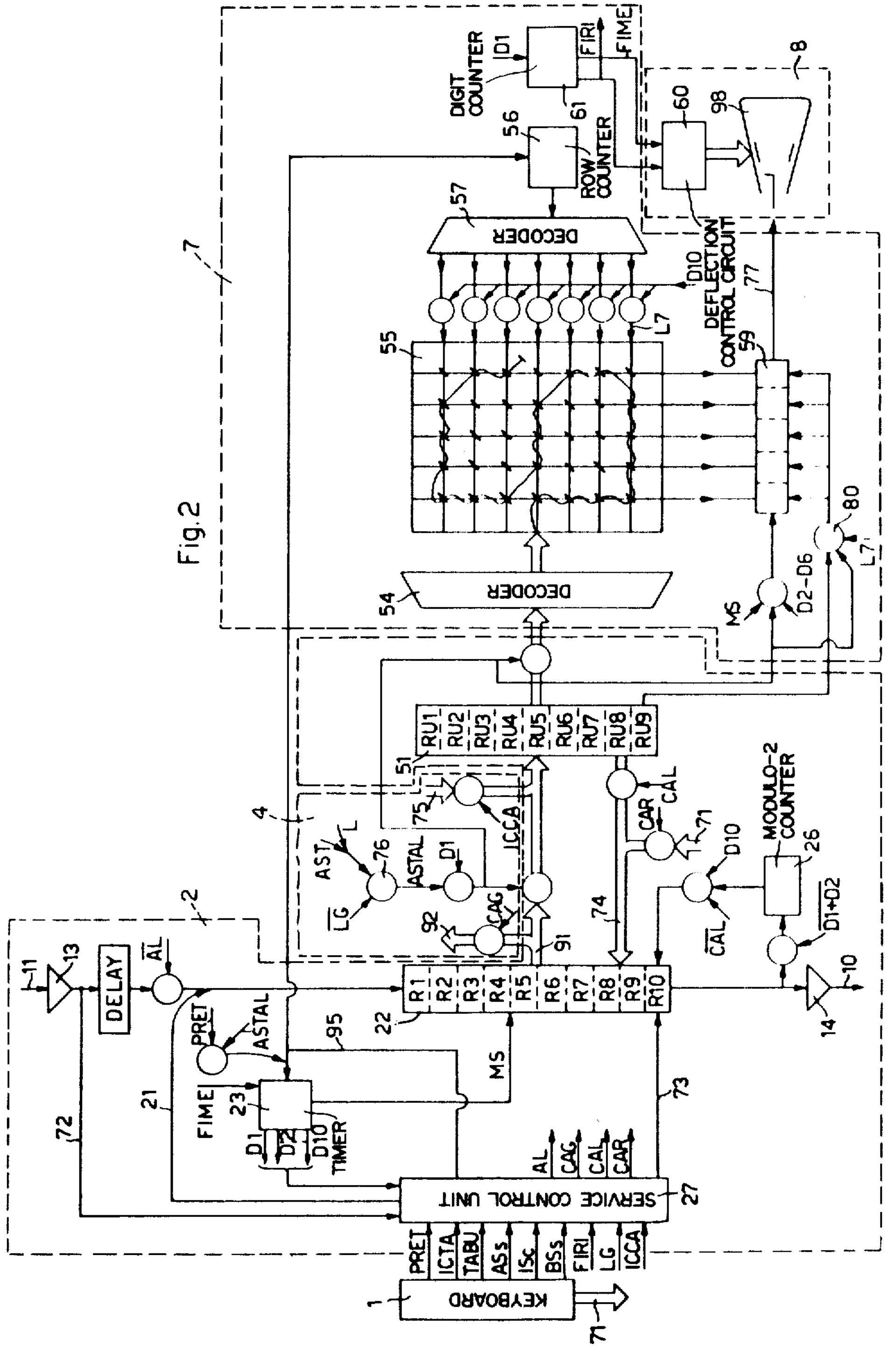
FIG. 2 is a block diagram of the control units of the store and of the visual display.

The cores of matrix 55 which were placed in binary state 1 in order to represent the character present in bit period D1 of shift register 22, will remain in such state until the bit period D10 immediately following. Then, at the immediately following bit period D1, the matrix cores will be placed in a state such as to represent the immediately following character in the store. As indicated in FIG. 2, each row wire of the core matrix is energized at each one of the 256 D10 digit periods that succeed one another during the storage cycle in which the row in question is interrogated by decoder 57. Thus, through the five reading wires of the matrix, each of which is linked with all the cores of a column, there will be transferred to register 59 the contents of the core row interrogated, and this will happen at each of the digit periods D10. Thus, during each storage cycle, register 59 is successively loaded with the 256 groups of five bits which represent an equivalent number of horizontal sections of the representation made in matrix 55 of the 256 characters contained in the storage device. Similarly, in the next storage cycle, there will be successively loaded into register 59 the 256 groups of each bit representing the next horizontal slice of the said 256 characters, and similarly so on for the remaining storage cycles up to the seventh.

Register 59 is a shift register wherein transmission of shift pulses MS during bit periods D2–D6 of each digit period causes the series output onto line 77 of the five bits that were put into the register during the immediately preceding D10 bit period. The binary signals fed out on line 77 directly control illumination of the cathode-ray tube 98 of visual display unit 8.

Figure 3:
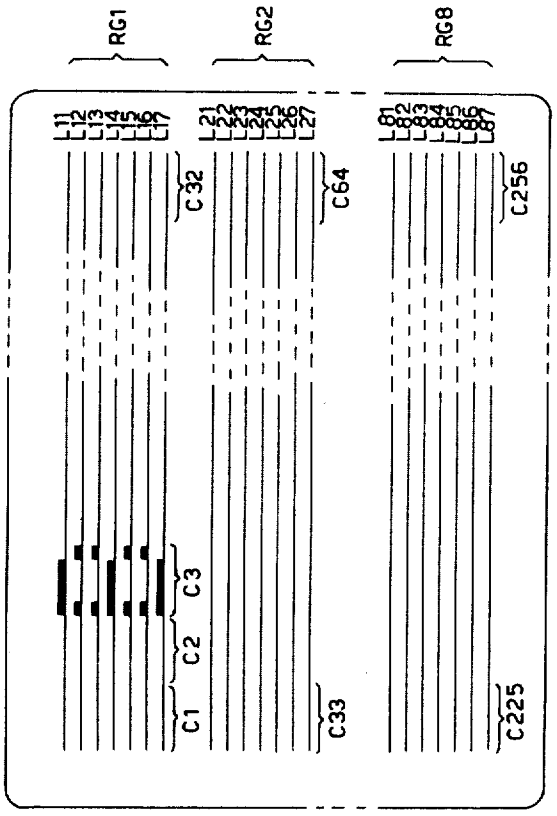
FIG. 3 shows in part the scanning mode of the visual display.

The cathode-ray tube screen is divided (FIG. 3) into 8 bands, RG1, RG2,.....RG8, each formed of seven lines. Each band is capable of containing 32 characters so that the entire screen can contain a total of 256 characters, equal to the contents of storage device 3. In FIG. 3 the lines of the first band are identified by L11–L17, those of the second band by L21–L27 and so on, wherein the first numeral after the letter L specifies the row and the second numeral the line. The beam scans first line L11 of first band RG1, then first line L21 of second band RG2 and so on, starting from the left for each of the lines scanned. Having finished scanning first line L81 of eighth band RG8, the beam starts to scan second line L12 of first band RG1 and thereafter all the second lines in succession, and then continues the process sequentially.

For executing this type of scanning, the beam is controlled through deflection control circuit 60 by a digit period counter 61 which furnishes an end of band signal FIRI after each group of 32 digit periods and an end of screen signal FIME after 256 digit periods. Scanning is initiated at each start timing CS signal identifying the start of a storage cycle. It follows therefore that screen scanning proceeds in synchronization with circulation of data in the storage device, being completed in 7 storage cycles and repeated in the cycles which follow. Naturally, the time corresponding to 7 storage cycles is very much less than the image persistence on the screen and on the retina. It is clear from the foregoing that the 256 characters circulating in the storage device are methodically displayed in visual reproduction on the screen of the cathode-ray tube 98 from left to right, starting at the top and finishing at the bottom.

It has already been made clear that during actuation of characters on the keyboard, the storage cell following the last character posted contains in each case the bit "*bs*" indicating the last character written in the storage device. On the visual display screen there also appears an indicating sign in the position corresponding to the said bit "*bs*." For displaying bit "*bs*,"a stage RU9 of register 51 is loaded with the contents of stage R1 of shift register 22 at time D1. When counter 56 activates the seventh row L7 of the matrix, and if at the same time stage RU9 should contain the bit "*bs*"=1, then there will be entered through gate 80 directly into register 59 five bits equal to binary 1 which will be shifted in the register, thereby causing the appearance of a horizontal dash on the screen, which serves to indicate the position following that of the last character actually present in the storage device. By this means the screen is caused to offer a complete visual reproduction of the contents of the delay line storage device 3, whereby and as must be obvious from the preceding description, a strict correspondence is obtained between delay line storage device 3 and the screen of cathode-ray tube 98.

The data terminal is furthermore provided with means for controlling the format in which data is written into the storage device from the keyboard. This enables the message for transmission to the computer to be compiled in the storage device by the operator in a manner chosen by himself and consistent with the meaning of the message concerned. For instance, if the message is composed of several numbers or words, it is possible to tabulate them according to various criteria at the operator's discretion. Format control is based on control of the displacement of the service bit "*bs*" from one storage cell to another. The fact that visual display unit 8 is continuously active in all stages of data character actuation by the keyboard and is arranged to display the said bit "*bs*" enables the operator to exercise a continuous control over the procedure of message compilation.

Line controller 4 also has the capability of automatically inserting the end of block character ETB or ETX at the moment of transmission to the computer, putting it in every case in the 256th character position, and also the start of block character STX which it puts in every case before the first character position. Clearly therefore, the format of the message as compiled in the storage device, is preserved unaltered both in visual display and in transmission.

In particular, the terminal is fitted with a "forward spacing" key. By operating this key, the operator can write a character into the storage device not in the cell immediately following that occupied by the previously digitized character but displaced by one whole cell period. What happens is that, in operating the "forward spacing" key, the operator generates signal AS*s* in the service control circuit 27, causes regeneration of service bit "*bs*" read on line 72 through line 21, not at the first D1 encountered, but at the next one, so that the next character posted on the keyboard will be written into the storage device displaced by one cell with respect to the previously written character. The terminal is also fitted with a "-back spacing and cancellation" key. Operation of this key generates signal IS*c* which, acting through service control circuit 27, has the effect that, when the service bit "*bs*" is read on line 72, it will not be regenerated as usual through the line 21 but through line 73, thereby being shifted forward one cell, i.e., to the D1 immediately preceding the last character present in the storage. Because of this, the next character immediately thereafter actuated by the keyboard will be written in the position occupied beforehand by the previous character, thereby canceling the latter.

The terminal is further provided with a "row jump" key by using which the operator can make certain that the character immediately thereafter actuated by the keyboard will be written into the storage device in the cell occupying the position n ×32+1 (where n may be from 1 to 7), the character previously actuated by the keyboard having entered a cell position in the row (n−1) ×32+1 to (n−1) ×32+32. Operation of the "row jump" key generates signal BS*s* which, acting through shifting means in the circuit service control 27, prevents regeneration of service bit "*bs*." Service control circuit 27 waits for counter 61 to send signal FIRI which occurs when it is in state C32 or a whole number multiple thereof. Therefore when signal FIRI is applied to service control circuit 27 the latter will, through line 21, regenerate the service bit "*bs*," not at the first D1 that occurs, which is the n ×32nd, but because of the presence of a delay, at the next following D1. It is therefore evident that the character subsequently actuated by the keyboard will occupy the position following position n ×32 in the delay line storage device 3 and be displayed by the cathode-ray tube 98 at the start of the (n+1) th row.

Furthermore, in order to secure that the numbers actuated by the keyboard will be tabulated on the least significant digit, with the keyboard number being digitized from the most significant digit to the least significant, the first digit can be written in the last position of one of the eighth rows into which the screen is divided. Then the second most significant digit can be written in place of the first and the latter be shifted back one cell, and so on. To achieve this, the terminal is provided with a "tabulating" key. Operation of the tabulating key generates signal TABU which, acting through shifting means in the service control circuit 27, has the effect that, when the service bit "*bs*" is read along line 72, its regeneration will be prevented. When service control circuit 27 receives from counter 61 signal FIRI, which as already mentioned reports the cell positions n ×32, the service bit "*bs*" will immediately be applied through line 21 and will thus occupy the first binary position D1 of cell C32 or a multiple thereof.

In addition, a dummy service bit "*b1*" is forced by line 21 into binary position D2 of the cell C32 (or a multiple thereof). Actuation of the keyboard by the operator of the first digit now generates signal ICTA which enters service control circuit 27. When service bit "*bs*" appears at the output from the delay line it will, at the first time D1, immediately be regenerated through line 21 while the service bit "*b1*" immediately following bit "*bs*" in the delay line output will be regenerated through line 73 in stage R10. The bit "*b1*" is thereby forced into the immediately preceding cell, i.e., into position D2 of cell C31.

At the same time D1, signal ICTA authorizes service control circuit 27 to generate signal CAR which, through input 74 from keyboard output 71, forces the character posted on the keyboard into stages R3–R9 of shift register 22, i.e., into cell C31. The operator digitizes the second numeral on the keyboard, working from the most to the least significant, as a result of which signal ICTA is again generated. When service control circuit 27 senses bit "*b1*" read out from the store, said bit "*b1*" and the character which follows it as far as bit "*bs*" are regenerated through line 73; i.e., they are shifted by one cell and take up occupation of cell C30. When bit "*bs*" appears it is immediately regenerated through line 21 while service control circuit 27 generates signal CAR which as usual allows filling of stages R3–R9 of shift register 22 with the second numeral digitized on the keyboard, causing the latter to occupy cell C31. The bit "*bs*" still remains in position D1 of cell C32.

Thus, as the numbers are posted or actuated on the keyboard, starting with the most significant and working towards the least significant digit, so does this backwards shift progressively operate by one whole cell at a time, thereby allowing tabulation of the posted digits to be made on cell C32 (or a multiple thereof).

It will be evident that many minor changes may be made in the apparatus described herein, without departure from the scope of the invention. Accordingly, the invention is not to be considered limited by such description, but only by the scope of the appended claims.

What is claimed is:

1. Apparatus for writing data sequentially in a recirculating delay line store formed of a plurality of character cells for storing characters and an additional fixed cell for permanently storing a memory starting mark, each one of said character cells being formed of a number of bit positions and at least an additional bit position, a timer conditioned by said starting mark for counting bit positions of said cells, comprising a register to store a single character at a time and connecting the output with the input of said store, means for posting characters to be written in said store, means for entering in said register an identification sign for circulation in said additional bit position in one of said character cells, circuit means comprising a first arrangement controlled by said timer and said identification sign for causing the posted character to be entered through said register in the cell identified by said identification sign, said first arrangement comprising a circuit element for causing also said identification sign to be shifted one cell upon entering said posted character, wherein the improvement comprises:

a group of depressible sign-displacing keys, shifting means comprised in said circuit means, and responsive to the depression of each one of said sign-displacing keys to cooperate with said register under the control of said timer to displace said indicating sign in one of the two directions in said store by one or more cells independently of the posted characters.

2. Apparatus according to claim 1, further comprising a display device operative to display the characters in the cells in an array of positions corresponding to respective cells and further operative to display a symbol marking the position corresponding to that cell marked by the identification sign.

3. Apparatus according to claim 1, wherein said shifting means in response to a back spacing key comprised in said sign-displacing keys shifts said identification sign by one cell in the direction opposite to that of the shifting caused by said first arrangement, whereby a character posted after depression of said back spacing key is entered in place of the previously entered character.

4. Apparatus according to claim 1, wherein said circuit means are also conditionable for recording in said register an additional identification sign for circulation in a second additional bit position of a selected character cell of said store, a reading circuit being responsive to said additional identification sign for reading the character recorded in the corresponding cell when circulating in said register, a further arrangement displacing said additional identification sign independently from the first-named identification sign, said further arrangement being controlled by said reading circuit for automatically displacing said additional identification sign one step upon a reading operation.

5. Apparatus according to claim 4, wherein the posted or read characters are displaced on a cathode ray tube in the same sequence as they are stored in said store, comprising means controlled by said timer to control the display of said indicating sign, said tube having a group of rows each one adapted to display a predetermined portion of said store, a new line key comprised in said sign displacing keys being adapted to condition said shifting means to displace said indicating sign to the character cell associated with the first position of the next following one of said rows.

6. Apparatus according to claim 5, comprising matrix means providing a representation of each one of the successive characters posted in or read out from said store by the generation of signals defining the point of the character in accordance with a line by line scanning thereof, each one of said rows comprising a set of scanning lines, feeding means being provided for feeding said tube with the signals pertaining to the successive lines of the matrix representation of the characters, the signals for a particular line of all the characters of the store being sent to said tube before sending the signals for the following lines of all the characters and the scanning of the cathode ray tube being synchronized with the rhythm of circulation of data in the store, whereby the lines of a single row are scanned intercalated with the lines of the other rows.

7. Apparatus according to claim 1, wherein the shifting means are responsive to a tabulating key comprised in said sign-displacing keys to shift said identification sign to a predetermined cell and thereafter to block said circuit element so that each character posted is entered in the predetermined cell, said shifting means being further operative in response to the posting of each new character to shift all characters already entered by one cell.

8. Apparatus for writing data sequentially in a recirculating delay line store formed of a plurality of character cells for storing characters and an additional fixed cell for permanently storing a memory starting mark, each one of said character cells being formed of a number of bit positions and at least an additional bit position, a timer conditioned by said starting mark for counting the bit positions of said cells, comprising a register adapted to store a single character at a time and connecting the output with the input of said store, an alphanumeric keyboard for posting characters to be written in said store, means for entering in said register a first identification sign for circulation in said additional bit position on one of said character cells, circuit means comprising a first arrangement controlled by said identification sign and said timer for causing the posted character to be entered through said register in the cell identified by said identification sign, said first arrangement comprising a circuit element for causing also said first identification sign to be shifted one cell in a predetermined direction upon entering said posted character, wherein the improvement comprises:

a tabulating key, counting means conditioned by said starting mark to generate at least a further signal which indicates a predetermined character cell, shifting means comprised in said circuit means and jointly conditioned by said further signal and by a signal generated at the depression of said tabulation key to displace said first identification sign to the associated bit position of said predetermined cell, another arrangement comprised in said circuit means being conditioned concomitantly with said shifting means to enter a second identification sign in another bit position of said predetermined cell, said circuit means comprising a device effective at the depression of any key of said alphanumeric keyboard for preventing said first arrangement from displacing said first identification sign and for causing said second identification sign and the characters written between said second identification sign and the cell next following said predetermined cell to be shifted one cell in a direction opposite to said predetermined direction.

9. Display apparatus for displaying the characters stored in a recirculating delay line store on a plurality of displaying rows provided on a cathode-ray tube, comprising a matrix having a set of signal-generating elements organized in lines and columns and conditionable to provide a representation of any character by causing a corresponding pattern of said elements to generate signals defining the points of characters to be displayed, each one of said rows having a number of lines equal to the lines of said matrix, means for scanning said matrix line by line to cause a register to temporarily store the signals generated by the elements of each line so scanned, and feeding means for feeding the signals stored in said register to said tube, wherein the improvement comprises:

timing means conditioned by a starting signal recorded in said store to generate a train of timing signals synchronized with the recirculating speed of said store thus indicating each character cell of said store, the capacity of said store being equal to the capacity of said tube, whereby said timing signals indicate also the cells of said tube, a decoding device controlled by said timing signals to sequentially condition said matrix according to the characters stored in said memory, and incrementing means controlled by said starting signal to increment said scanning means to shift the scanning of said matrix one line for each memory circulating cycle, a row shifting means being rendered effective for shifting the scanning of said tube one row by the timing signals of said train indicating the end of each row of said tube, whereby the lines of one row of said tube are scanned intercalated with the lines of the other rows.

10 A data transmission system for transmitting data between a central data processor and at least one terminal apparatus having an input device, a recirculating delay line store for storing data posted by said input device, a readout device store, and a line controller controlled by said central processor for either a polling procedure for dispatch of interrogation messages from said terminal or a selecting procedure for reception of answering messages by said terminal, one block at a time being stored in said store, wherein the improvement comprises:

a display screen for displaying the data stored in said store by characters formed on elements arranged in lines and columns, means for conditioning said line controller to prevent said polling and said selecting procedure, means controlled by said line controller when so conditioned for an additional dialogue causing the block store to be displayed by said display screen in a number of cycles of said store equal to the number of said character lines, first register means connected between the output and the input of said store and adapted to store a character at a time circulating in said store, decoding means for decoding the stored characters in displaying signals for said screen, second register means connected to said decoding means and adapted to store a character at a time, means included in said line controller for causing a character stored in said second register to be shifted to said second register during said selecting procedure and means included in said line controller for causing a character stored in said first register to be sent to said processor during said polling procedure, said means being conditioned by either a first signal assigning said apparatus to said input device or a second signal indicating that the selecting procedure has been completed, whereby a block of information is displayed after being stored in said store either by said input device or by said processor.